(12) United States Patent
Yamauchi et al.

(10) Patent No.: US 7,936,573 B2
(45) Date of Patent: *May 3, 2011

(54) BI-DIRECTIONAL DC-DC CONVERTER AND CONTROL METHOD

(75) Inventors: Tatsumi Yamauchi, Hitachiota (JP); Hiroyuki Shoji, Hitachi (JP); Seigou Yukutake, Hitachinaka (JP); Toshikazu Okubo, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/706,750

(22) Filed: Feb. 17, 2010

(65) Prior Publication Data

US 2010/0142228 A1  Jun. 10, 2010

Related U.S. Application Data

(63) Continuation of application No. 11/641,662, filed on Dec. 20, 2006, now Pat. No. 7,692,935.

(30) Foreign Application Priority Data

Dec. 21, 2005  (JP) ................................ 2005-367862

(51) Int. Cl.
  *H02M 3/335* (2006.01)
(52) U.S. Cl. .......................................... 363/16; 363/97
(58) Field of Classification Search .................. 363/15, 363/16, 84, 95, 97, 98
See application file for complete search history.

(56) References Cited

U.S. PATENT DOCUMENTS

| | | | |
|---|---|---|---|
| 4,864,478 A | 9/1989 | Bloom | |
| 4,947,311 A | 8/1990 | Peterson | |
| 5,181,169 A | 1/1993 | Murugan | |
| 5,892,664 A | 4/1999 | Vedder | |
| 7,000,125 B2 | 2/2006 | Chapuis et al. | |
| 7,692,935 B2 * | 4/2010 | Yamauchi et al. | 363/16 |
| 2002/0158590 A1 | 10/2002 | Saito et al. | |
| 2004/0085784 A1 | 5/2004 | Salama et al. | |
| 2004/0264219 A1 | 12/2004 | Zhang | |
| 2006/0033473 A1 | 2/2006 | Stanzel et al. | |
| 2006/0097576 A1 | 5/2006 | Kobayashi et al. | |

FOREIGN PATENT DOCUMENTS

| | | |
|---|---|---|
| JP | 07-322611 | 8/1995 |
| JP | 11-008910 | 1/1999 |
| JP | 2000-50404 A | 2/2000 |
| JP | 2002-165448 | 6/2002 |
| JP | 2003-111413 | 4/2003 |
| WO | 02/101910 A2 | 12/2002 |

OTHER PUBLICATIONS

Japanese Office Action dated Dec. 28, 2010 with partial English translation (five (5) pages).

* cited by examiner

*Primary Examiner* — Harry Behm
*Assistant Examiner* — Matthew Grubb
(74) *Attorney, Agent, or Firm* — Crowell & Moring LLP

(57) ABSTRACT

A bi-directional DC-DC converter uses a transformer for both step-down and step-up operations. A switching frequency for operating a switching device is set separately for the step-down and step-up operations. When, for example, the switching frequency during the step-up operation is lower than the switching frequency during the step-down operation, the range in which the duty ratio in PWM control can be controlled is widened, compensating for step-up ratio insufficiency. Conversely, step-down ratio insufficiency is compensated for by making the switching frequency during the step-down operation lower than the switching frequency during the step-up operation.

14 Claims, 13 Drawing Sheets

STEP-DOWN OPERATION

STEP-UP OPERATION

BI-DIRECTIONAL DC-DC CONVERTER AND CONTROL METHOD

CROSS REFERENCE TO RELATED APPLICATION

This application is a continuing application of U.S. application Ser. No. 11/641,662, filed Dec. 20, 2006, which claims priority under 35 U.S.C. §119 to Japanese Patent Application No. 2005-367862, filed Dec. 21, 2005, the entire disclosure of which are herein expressly incorporated by reference.

FIELD OF THE INVENTION

The present invention relates to a DC-DC converter that is provided between a first voltage power supply and a second voltage power supply and performs forward power conversion from a first voltage to a second voltage and backward power conversion from the second voltage to the first voltage.

BACKGROUND OF THE INVENTION

With a background of social problems such as global warming and an increase in crude oil prices, there is a rapid spread of hybrid electric vehicles (HEVs) and other vehicles targeted at a high mileage. In general, an HEV includes a main high-voltage battery for driving an engine assisting motor and an auxiliary low-voltage battery for supplying electric power to electronic devices mounted on the vehicle. The main high-voltage battery is charged when the engine rotates the motor and produces (regenerates) electric power. The generated electric power is converted by a DC-DC converter to electric power for the auxiliary low-voltage battery and supplied to the vehicle-mounted electronic devices. Thus, the main purpose of the DC-DC converter disposed between the main high-voltage battery and the auxiliary low-voltage battery is to cause a step-down operation from the main high-voltage battery to the auxiliary low-voltage battery. However, there is also a need to cause a step-up operation from the auxiliary low-voltage battery to the main high-voltage battery. For example, the engine may not be capable of being started due to a low voltage of the main high-voltage battery. In this case, if electric power can be supplied from the auxiliary low-voltage battery to the main high-voltage battery, the auxiliary low-voltage battery can compensate for the power insufficiency to start the engine through the main high-voltage battery alone. Accordingly, a bi-directional DC-DC converter having both a step-down function that serves from the high-voltage side to the low-voltage side and a step-up function that serves from the low-voltage side to the high-voltage side is demanded.

Examples of the prior art related to this type of bi-directional DC-DC converter are disclosed in, for example, Patent Documents 1 to 3.

Patent Document 1: Japanese Patent Laid-open No. 2003-111413
Patent Document 2: Japanese Patent Laid-open No. 2002-165448
Patent Document 3: Japanese Patent Laid-open No. 11 (1999)-8910

SUMMARY OF THE INVENTION

Suppose that a step-down ratio and a step-up ratio are determined by a ratio between the number of turns on the primary side of a transformer and the number of turns on the secondary side. If a ratio of the number of turns on the transformer that is optimum for a step-down operation is set, a problem of the inability to meet a step-up ratio arises. Conversely, if the step-up ratio is focused in setting a ratio of the number of turns on the transformer, another problem of a too low voltage during a step-down operation occurs. Even if a bi-directional DC-DC converter is structured without a transformer, when a difference between the step-down ratio and the step-up ratio is relatively large, desired bi-directional voltage ratios cannot be obtained easily.

An object of the present invention is to provide a DC-DC converter, for bi-directionally converting electric power between two different voltages, from which a voltage is obtained across two terminals in a desired range even when a difference between its step-down ratio and step-up ratio is needed.

Means of Solving the Problems

With a usual switching power supply, the step-down ratio and step-up ratio can be adjusted by adjusting the duty ratio of a pulse width modulation (PWM) signal (a pulse frequency modulation (PFM) signal may be used instead, which is also true for the description that follows) that controls the switching device. When a transformer is used, the step-down ratio and step-up ratio can be determined by the ratio between the number of turns on the primary side of the transformer and the number of turns on the secondary side. However there may be a large difference between a demanded step-down ratio (N1) and step-up ratio (N2). In this case, the above-mentioned PWM control and transformer turns ratio alone may be insufficient.

In a preferred mode of the present invention, there is a difference in duty ratio range in PWM control between the step-down operation and the step-up operation.

As well known, the duty ratio in PWM control cannot be adjusted over a range from 0% to 100% due to restrictions on the minimum turned-on and turned-off times of a switching device. An allowable range of the duty ratio is, for example, 5% to 95%. Since the minimum turned-on and turned-off times of the switching device are unchangeable, when the switching frequency is lowered to prolong the cycle, the allowable duty ratio range can be widened accordingly. It is possible to obtain an allowable duty ratio range of, for example, 3% to 97%. Therefore, the easiest method of adjusting the duty ratio range is to adjusting the switching frequency.

In the preferred mode of the present invention, a means for setting a duty ratio range for the step-down operation and a duty ratio range in the step-up operation separately is provided.

In another preferred mode of the present invention, a DC-DC converter, which includes a transformer that connects a step-down conversion circuit and a step-up conversion circuit and converts electric power between two voltages, has a turns ratio switching means for switching the turns ratios of the transformer between the step-down operation and the step-up operation.

According to the preferred mode of the present invention, the duty ratio range in PWM control can be adjusted independently for the step-down operation and the step-up operation by making a switching frequency during the step-down operation different from, for example, a switching frequency during the step-up operation. Accordingly, when the frequency for the step-down ratio or step-up ratio, whichever is insufficient, is set to a value lower than the frequency for the other (the cycle, that is, the length of time of one cycle, is prolonged) to expand the duty ratio range in PWM control, the adjustable range of the step-down ratio or the step-up ratio can be expanded. Of course, it is also possible to use a duty ratio range adjusting means other than to adjust the switching frequency.

According to the other preferred mode of the present invention, since there is provided a means for using a different transformer turns ratio between the primary side and the secondary side depending on whether the voltage is dropped or boosted when a single transformer is used to drop and boost the voltage, transformer turns ratios optimum for the step-down ratio and step-up ratio can be set. As a result, the adjustable range of the step-down ratio or step-up ratio can be expanded.

These two types of techniques can be used separately or together, enabling the range of the step-down ratio or step-up ratio to be expanded.

Other purposes and features of the present invention will be clarified in the description of embodiments that follow.

DESCRIPTION OF THE PREFERRED EMBODIMENTS

In, for example, a DC-DC converter that has two batteries with two different voltages and bi-directionally converts electric power between the two voltages, the voltage range of the main high-voltage battery is determined according to the secondary battery mounted, required system specifications, and other factors. The voltage range of the auxiliary low-voltage battery is also determined similarly.

Figure 2:
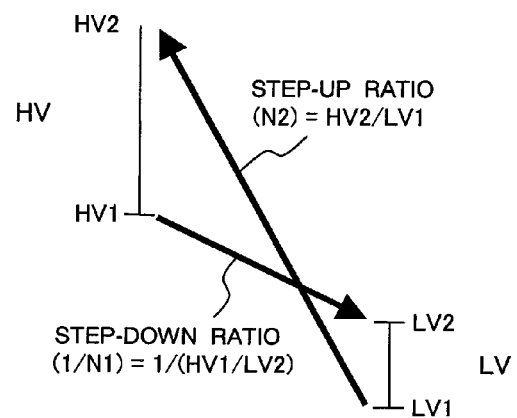
FIG. 2 illustrates the relation between the step-down ratio and the step-up ratio of the bidirectional DC-DC converter.

FIG. 2 shows a step-down ratio and step-up ratio when electric power conversion is performed between two different voltages, high voltage and low voltage. The largest difference between N1 of the step-down ratio 1/N1 and the step-up ratio N2 may be present in FIG. 2. The step-down ratio 1/N1 during the step-down operation from the high-voltage side to the low-voltage side is defined as $1/N1=1/(HV1/LV2)$, and the step-up ratio N2 during the step-up operation from the low-voltage side to the high-voltage side is defined as $HV2/LV1$. If N1 of the step-down ratio 1/N1 is relatively close to the step-up ratio N2, a bi-directional DC-DC converter can be designed with ease. However, HV1, HV2, LV1, and LV2 vary according to the charted states of the two batteries, battery deterioration states, and other conditions, so there may be often a large difference between N1 and N2, making the design difficult. Preferred embodiments of the present invention that addresses this problem will be described below in detail with reference to the drawings.

First Embodiment

Figure 1:
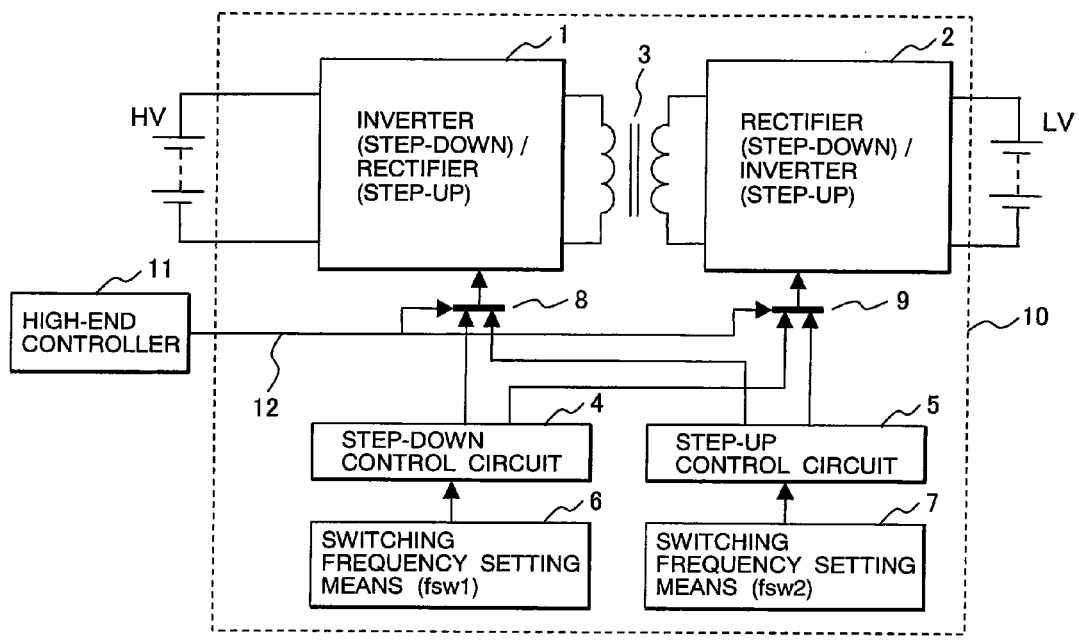
FIG. 1 shows the entire structure of a bi-directional DC-DC converter according to a first embodiment of the present invention.

FIG. 1 shows the entire structure of a bi-directional DC-DC converter according to a first embodiment of the present invention. The main circuits in FIG. 1 are a high-voltage DC power supply HV, a low-voltage DC power supply LV, a main high-voltage circuit 1 having a switching means, and a main low-voltage circuit 2 having a switching means, and a transformer 3.

Provided as control circuits are a step-down control circuit 4 for dropping the voltage from the HV side to the LV side, a step-up control circuit 5 for boosting the voltage, a switching frequency setting means 6 for a switching signal generated by the step-down control circuit 4, and a frequency setting means 7 for the step-up control circuit 5. Selectors 8 and 9 are also included; the selector 8 selectively selects a control signal sent from the step-down control circuit 4 and a control signal sent from the step-up control circuit 5 and sends the selected signal to the main high-voltage circuit 1; the selector 9 selectively selects a control signal sent from the step-down control circuit 4 and a control signal sent from the step-up control circuit 5 and sends the selected signal to the main low-voltage circuit 2.

The above components excluding the power supplies HV and LV constitute the bi-directional DC-DC converter 10.

The bi-directional DC-DC converter 10 is structured so that a step-down/step-up control switching signal 12 is received from a high-end controller 11 such as engine controller.

Next, operation in FIG. 1 will be described. In the step-down operation from the high-voltage DC power supply HV to the low-voltage DC power supply LV, a DC voltage of the HV is converted to an AC voltage in the main high-voltage circuit 1, the AC voltage is transferred to the LV by the transformer 3, and the transferred AC voltage is rectified in the main low-voltage circuit 2. At this time, the switching means in the main high-voltage circuit 1 and main low-voltage circuit 2 are controlled by control signals generated by the step-down control circuit 4 and selected by the selectors 8 and 9. The step-down/step-up control switching signal 12 sent from the high-end controller 11 and input to the selectors 8 and 9 commands a step-down operation. The step-down control circuit 4 generates control signals to be supplied to the switching means according to the switching frequency set by the switching frequency setting means 6.

During the step-down operation, the step-up control circuit 5 and switching frequency setting means 7 may or may not operate because they do not affect the step-down operation. To reduce the power consumption, however, the step-up control circuit 5 and switching frequency setting means 7 are preferably stopped. As such, the step-down operation from the high-voltage DC power supply HV to the low-voltage DC power supply LV is performed.

In the step-up operation from the low-voltage DC power supply LV to the high-voltage DC power supply HV, the DC voltage of the LV is converted into an AC voltage in the main low-voltage circuit 2. The converted AC voltage is transferred by the transformer 3 to the HV and then rectified in the main high-voltage circuit 1. At this time, the switching means in the main low-voltage circuit 2 and main high-voltage circuit 1 are controlled by control signals generated in the step-up control circuit 5 and selected by the selectors 8 and 9. The step-down/step-up control switching signal 12 input from the selectors 8 and 9 from the high-end controller 11 commands a step-up operation. The step-up control circuit 5 generates controls signals to be supplied to the switching means, according to the switching frequency set by the switching frequency setting means 7.

During the step-up operation, the step-down control circuit 4 and switching frequency setting means 6 may or may not operate because they do not affect the step-up operation. To reduce the power consumption, however, the step-down control circuit 4 and switching frequency setting means 6 are preferably stopped. As such, the step-up operation from the low-voltage DC power supply LV to the high-voltage DC power supply HV is performed.

The main high-voltage circuit 1 operates as an inverter that converts a DC voltage into an AC voltage during the step-down operation and as a rectifier that converts an AC voltage into a DC voltage during the step-up operation. The main low-voltage circuit 2 operates as a rectifier that converts an AC voltage into a DC voltage during the step-down operation and as an inverter that converts a DC voltage into an AC voltage during the step-up operation.

The switching means included in the main high-voltage circuit 1 and main low-voltage circuit 2 may be operated by diodes alone that are connected in parallel according to the operation, without having them perform a switching operation. This is because, during the rectification operation, for example, rectification by the diodes can basically achieve the purpose. When the switching means is turned on actively during the rectification operation, its purpose is usually to perform synchronous rectification with a switching device with less loss than the diode.

Next, the relation among the step-down ratio, the step-up ratio, the turns ratios of the transformer, and switching frequencies fsw1 and fsw2 will be described with reference again to FIG. 2.

FIG. 2 illustrates the relation between the voltage range (HV1 to HV2) of the high-voltage DC power supply HV and the voltage range (LV1 to LV2) of the low-voltage power supply LV. In the step-down operation, the step-down ratio (indicated by N1) is minimized when the HV is at the lowest voltage (HV1) and the LV is at the highest voltage (LV2). In the step-up operation, the step-up ratio (indicated by N2) is maximized when the LV is at the lowest voltage (LV1) and the HV is at the highest voltage (HV2).

When there is a large difference between the step-down ratio and the step-up ratio, as described above, a significant design parameter in FIG. 1 is the turns ratio of the transformer. When both the step-down operation from the HV to LV and the step-up operation from the LV to the HV are performed, the step-down ratio and step-up ratio are largely affected by the turns ratio of the transformer because the transformer is shared by the main high-voltage circuit 1 and main low-voltage circuit 2. If the turns ratio, for example, is determined with the step-down operation prioritized, a sufficient step-up ratio may not be obtained. Conversely, if the turns ratio is determined with the step-up operation prioritized, a sufficient step-down ratio cannot be obtained, resulting in a too low LV voltage.

In this embodiment, the above-mentioned switching frequencies during the step-down and step-up operations are set independently, so the step-down and step-up ratios can be set in a wide range. The switching frequencies fsw1 and fsw2 respectively set in the switching frequency setting means 6 and 7 are factory-set to unique values; they may be left unchanged after the product is shipped or may be changed during an operation after the shipping, according to the voltages of the HV and LV, the value of the load current (large or small), or another factor.

Figure 3A:
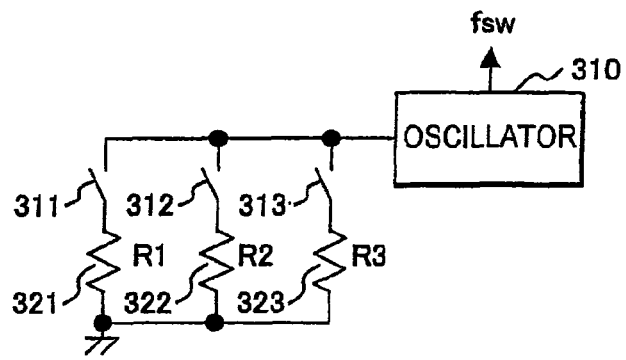
FIG. 3A shows first example of the structure of the switching frequency setting and adjusting means in the first embodiment of the present invention.
Figure 3B:
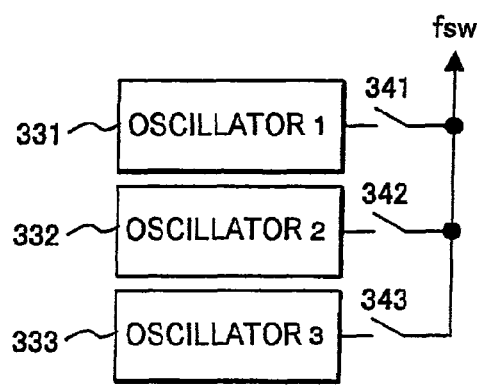
FIG. 3B shows second example of the structure of the switching frequency setting and adjusting means in the first embodiment of the present invention.
Figure 3C:
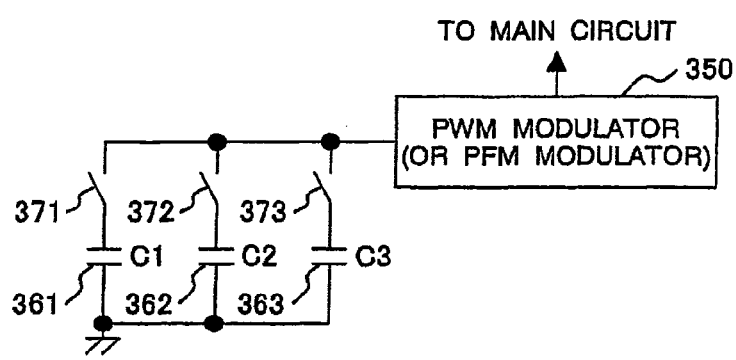
FIG. 3C shows third example of the structure of the switching frequency setting and adjusting means in the first embodiment of the present invention.

FIGS. 3A to 3C show an example of the structure of the switching frequency setting means in the first embodiment.

In FIG. 3A, switches 311 to 313, used as the switching means of the switching frequency setting means 6 and 7, selectively select resistors 321 to 323, respectively, to change the frequency fsw of an oscillator 310. In FIG. 3B, a plurality of oscillators 331 to 333 with different frequencies are provided; to change the output frequency fsw, one oscillator is selected with a switch 341, 342, or 343. In FIG. 3C, the signal frequency of a discrete component, such as a carrier oscillator, in a PWM modulator 350 is adjusted by selecting the constant of an external component, such as the capacitance of a capacitor 361, 362, or 363, with a switch 371, 372, or 373.

Figure 4:
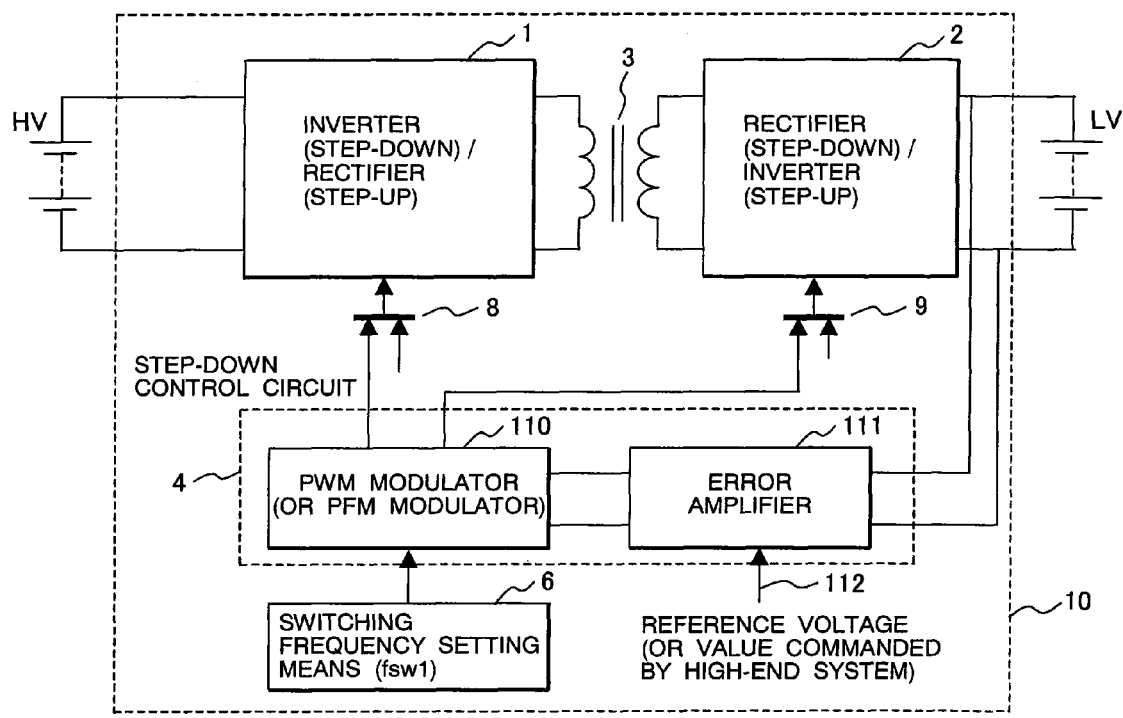
FIG. 4 shows a specific example of the structure of the step-down control circuit in the first embodiment.

FIG. 4 shows a specific example of the structure of the step-down control circuit according to the first embodiment. FIG. 4 is the same as FIG. 1 except that the structure of the control system of the step-down control circuit 4 is depicted in detail. An error amplifier 111 amplifies the difference between the voltage of the low-voltage DC power supply LV and a reference voltage 112 and sends the amplified error to a PWM modulator (or PFM modulator) 110. The PWM modulator 110 performs PWM modulation (or PFM modulation) on the amplified result received from the error amplifier 111 and sends the resulting signal to the switching means in the main high-voltage circuit 1 and main low-voltage circuit 2. Although the step-up control circuit 5 in FIG. 1 is omitted in FIG. 4, it has the same structure as the step-down control circuit 4 except that the step-up control circuit 5 receives a voltage from the high-voltage DC power supply HV and outputs it to terminals, on the selectors 8 and 9, not used by the step-down control circuit 4.

Figure 5A:
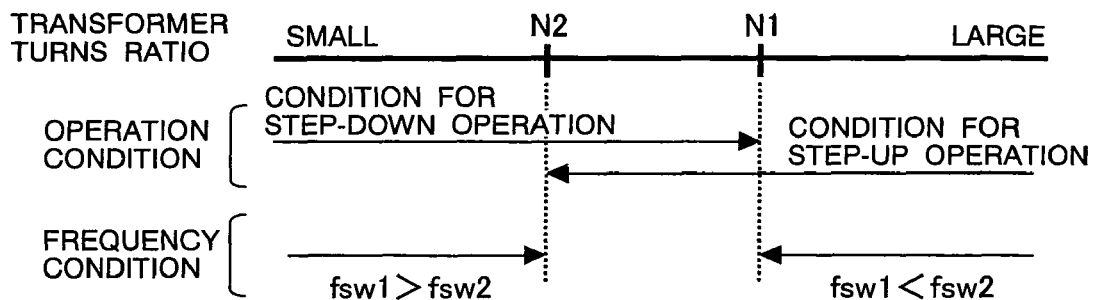
FIG. 5A illustrates first relation between the frequencies set by the switching frequency setting means.

FIG. 5A illustrates first relation between the turns ratio of the transformer 3 and the frequencies fsw1 and fsw2 set by the switching frequency setting means 6 and 7. In FIG. 5A, the transformer turns ratio (N1) required for dropping the voltage and the transformer turns ratio (N2) required for boosting the voltage are indicated on the horizontal axis. There is no problem if transformer turns ratios that satisfy the conditions for both the step-down and step-up operations are selected. When losses in the transformer, the switching device, and other circuits are considered, it is difficult to satisfy both conditions. In this case, either the step-down or step-up operation must be prioritized when transformer turns ratios are determined. When the switching frequency fsw1 during the step-down operation and the switching frequency fsw2 during the step-up operation are set as shown in FIG. 5A, the step-up and step-down ratios, which are difficult to satisfy simultaneously with only the transformer turns ratio, can be satisfied.

Figure 5B:
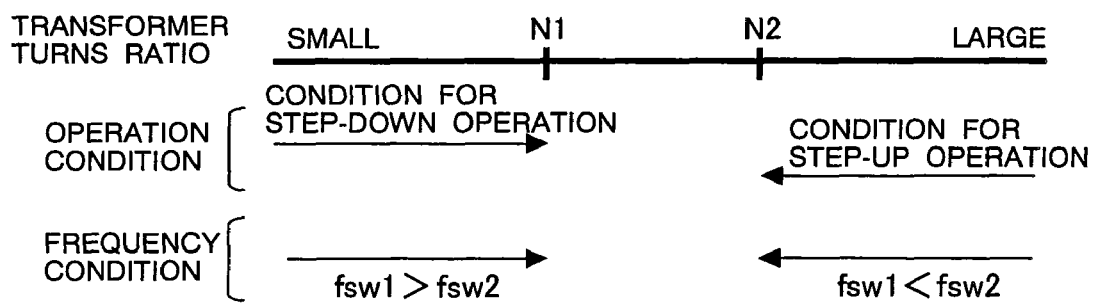
FIG. 5B illustrates second relation between the frequencies set by the switching frequency setting means.

FIG. 5B illustrates second relation between the turns ratio of the transformer 3 and the frequencies fsw1 and fsw2 set by the switching frequency setting means 6 and 7. Especially, FIG. 5B shows an example in which the transformer turns ratios obtained from calculations of the step-down and step-up ratios cannot be originally satisfied simultaneously. In this case as well, either the step-down or step-up operation must be prioritized when transformer turns ratios are determined. When the switching frequencies fsw1 and fsw2 are set as shown in FIG. 5B, the step-down and step-up ratios can be set in as wide a range as possible.

Now, the relation between the step-up ratio and the transformer turns ratio required for the step-up operation will be described. During the step-up operation, the main low-voltage circuit is operated as the step-up circuit. The product (N2_1×N2_2) of the step-up ratio N2_1 of the step-up circuit and the transformer turns ratio N2_2 is used to satisfy the step-up ratio. In this type of example, the transformer turns ratio N2_2 actually required for the step-up operation is N2_2 N2/N2_1. The transformer turns ratio N2_2 required for the step-up operation that has been described refers to the step-up ratio required for the transformer itself (in this case, the step-up ratio is N2_2).

As described above, if the switching frequency is reduced and the length of one cycle is prolonged, the duty ratio width in PWM control can be expanded, widening the step-down or step-up ratio range.

According to this embodiment, in a bi-directional DC-DC converter that cannot satisfy both step-down and step-up ratios simultaneously, a switching frequency selected during a step-down operation and a switching frequency selected during a step-up operation are set independently to different values. A resulting effect is that the step-down and step-up ratios can be set in a wide range. Another effect is that since one more design parameter is used in a design of a bi-directional DC-DC converter, the design can be completed more quickly.

Second Embodiment

Figure 6:
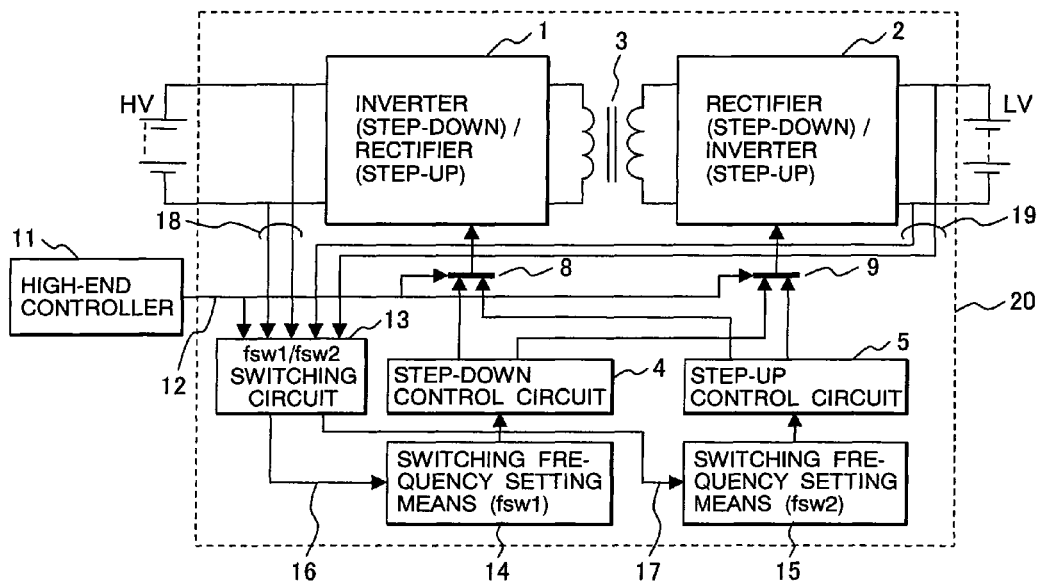
FIG. 6 shows the entire structure of a bi-directional DC-DC converter according to a second embodiment of the present invention.

FIG. 6 shows the entire structure of a bi-directional DC-DC converter according to a second embodiment of the present invention. The functional parts in FIG. 6 that are identical to the corresponding ones in FIG. 1 are assigned the same reference numerals to eliminate duplicate description. FIG. 6 differs from FIG. 1 in that a switching circuit 13 that switches between the switching frequencies fsw1 and fsw2 is provided. A switching frequency setting means 14 sets the switching frequency fsw1 according to an fsw1 switching signal 16 from the switching circuit 13. A switching frequency setting means 15 sets the switching frequency fsw2 according to an fsw2 switching signal 17 from the switching circuit 13. The switching circuit 13 is structured so that it receives the step-down/step-up control switching signal 12 sent from the high-end controller 11, a voltage signal 18 from the high-voltage DC power supply HV, and a voltage signal 19 from the low-voltage DC power supply LV. This completes the description of the structure of the bi-directional DC-DC converter 20.

The basic operation in the second embodiment is similar to the one in the first embodiment in FIG. 1. Operations different from FIG. 1 will be described below. In FIG. 1, the switching frequencies fsw1 and fsw2 cannot be changed during operation; in FIG. 6, however, they can be changed. Specifically, the switching frequency fsw1/fsw2 switching circuit 13 calculates a step-down or step-up ratio at that time from the voltage 18 of the high-voltage DC power supply HV and the voltage 19 of the low-voltage DC power supply LV. The switching circuit 13 can generate switching signals 16 and 17 for setting the required switching frequency fsw1 and fsw2 and send them to the switching frequency setting means 14 and 15.

The switching frequency fsw1/fsw2 switching circuit 13 receives the step-down/step-up control switching signal 12 supplied from the high-end controller 11. The switching circuit 13 can thus switch between calculation for generating fsw1 and another calculation for generating fsw2.

If the switching frequency fsw1/fsw2 switching circuit 13 includes an independent calculation circuit for generating fsw1 and fsw2, the absence of the step-down/step-up control switching signal 12 causes no operational problem. If the step-down/step-up control switching signal 12 is input externally, there is no need to provide an independent calculation circuit for generating fsw1 and fsw2 in the switching circuit 13, providing an effect of structuring the switching circuit 13 with less hardware.

According to the second embodiment, the switching frequencies fsw1 and fsw2 can be changed during a DC-DC converter operation according to the voltages of the high-voltage DC power supply HV and low-voltage DC power supply LV, thereby enabling a bi-directional DC-DC converter that widens the step-down and step-up ratio ranges to be obtained.

Third Embodiment

Figure 7:
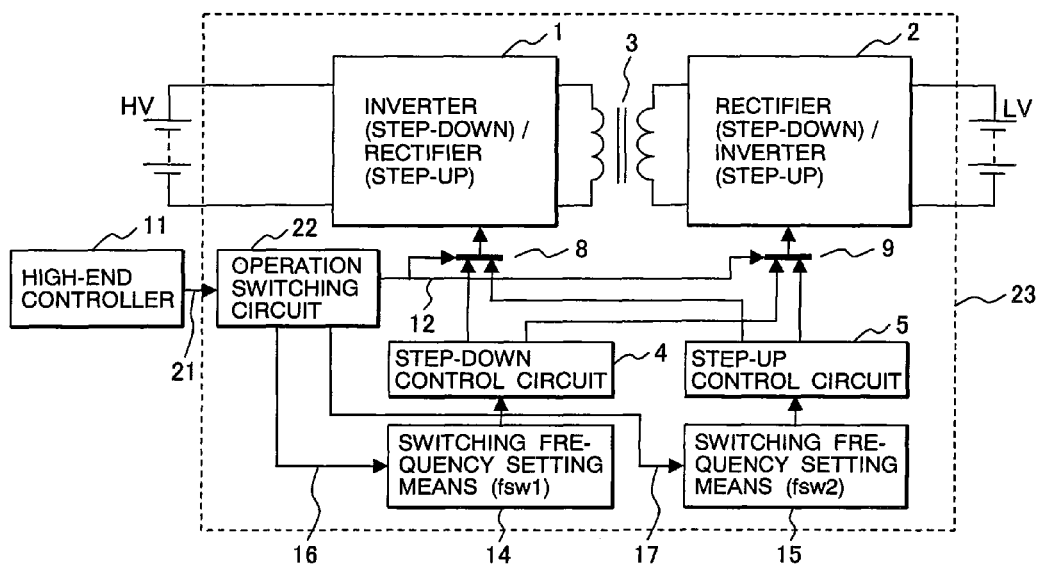
FIG. 7 shows the entire structure of a bi-directional DC-DC converter according to a third embodiment of the present invention.

FIG. 7 shows the entire structure of a bi-directional DC-DC converter according to a third embodiment of the present invention. The functional parts in FIG. 7 that are identical to the corresponding ones in FIG. 1 are assigned the same reference numerals to eliminate duplicate description. FIG. 7 differs from FIG. 1 in that the structure in FIG. 6 is further modified; an operation switching circuit 22 is provided, which receives a control signal 21 from the high-end controller 11 and switches the operation of the DC-DC converter 23.

The control signal 21 from the high-end controller 11 includes a command for indicating a step-down or step-up operation and frequency setting information about the switching frequency fsw1 during the step-down operation and the switching frequency fsw2 during the step-up operation. The operation switching circuit 22 generates a step-down/step-up control switching signal 12 according to the control signal 21 from the high-end controller 11, and also generates switching signals 16 and 17 to be respectively sent to the switching frequency setting means 14 and 15.

According to the third embodiment, a bi-directional DC-DC converter can be operated according to a command from a high-end controller 11. The high-end controller 11 monitors the states of a high-voltage DC power supply HV and low-voltage DC power supply LV and controls an entire system in which the DC-DC converter 23 is mounted, so the high-end controller 11 can command the DC-DC converter to perform an optimum operation according to the state.

Fourth Embodiment

Figure 8:
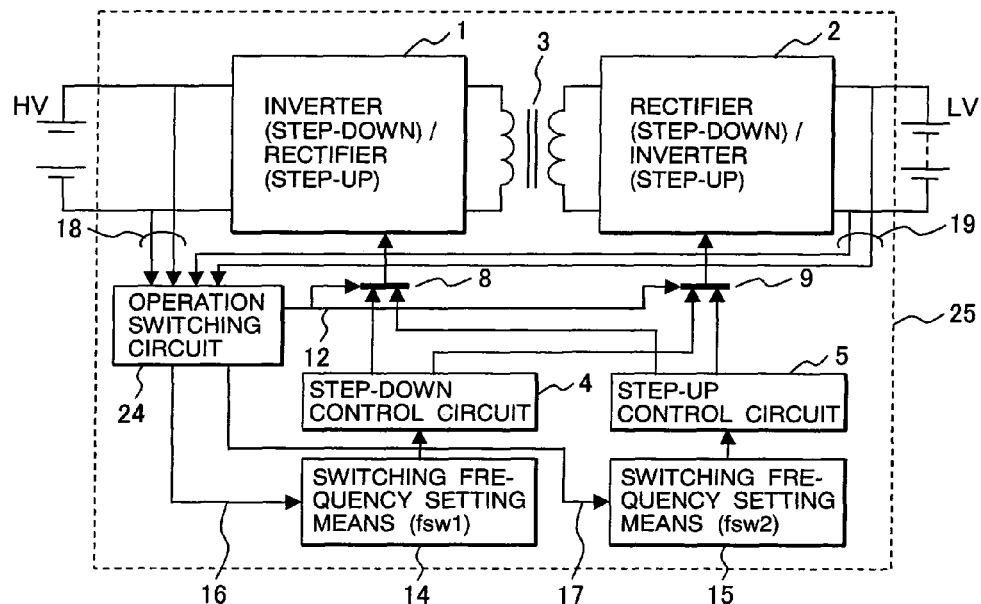
FIG. 8 shows the entire structure of a bi-directional DC-DC converter according to a fourth embodiment of the present invention.

FIG. 8 shows the entire structure of a bi-directional DC-DC converter according to a fourth embodiment of the present invention. The functional parts in FIG. 8 that are identical to the corresponding ones in FIG. 1 are assigned the same reference numerals to eliminate duplicate description. FIG. 8 differs from FIG. 1 in that the structure in FIG. 7 is further modified; an operation switching circuit 24 is structured so that it can make a switchover for the DC-DC converter 25 at its discretion, without receiving an external command. Specifically, the operation switching circuit 24 respectively receives voltages 18 and 19 from the high-voltage DC power supply HV and low-voltage DC power supply LV, selects an operation mode in which the DC-DC converter 25 should operate according to the voltage values, and outputs a step-down/step-up control switching signal 12. The operation switching circuit 24 also generates switching signals 16 and 17 to be respectively sent to the switching frequency setting means 14 and 15. When, for example, the voltage of the high-voltage DC power supply HV rises to or above a prescribed voltage and the voltage of the low-voltage DC power supply LV falls to or below a prescribed voltage, the operation switching circuit 24 sends a step-down control signal as the step-down/step-up control switching signal 12, and sends a switching frequency fsw1 switching signal suitable for the HV and LV voltages. When the HV voltage is equal to or below the prescribed voltage and the LV voltage is equal to or above the prescribed voltage, the operation switching circuit 24 sends a step-up signal as the step-down/step-up control switching signal 12, and sends a switching frequency fsw2 switching signal suitable for the HV and LV voltages.

According to the fourth embodiment, the DC-DC converter 25 can perform control by itself according to the values of the voltages of the high-voltage DC power supply HV and low-voltage DC power supply LV, even when there is no signal from a high-end system.

Fifth Embodiment

Figure 9:
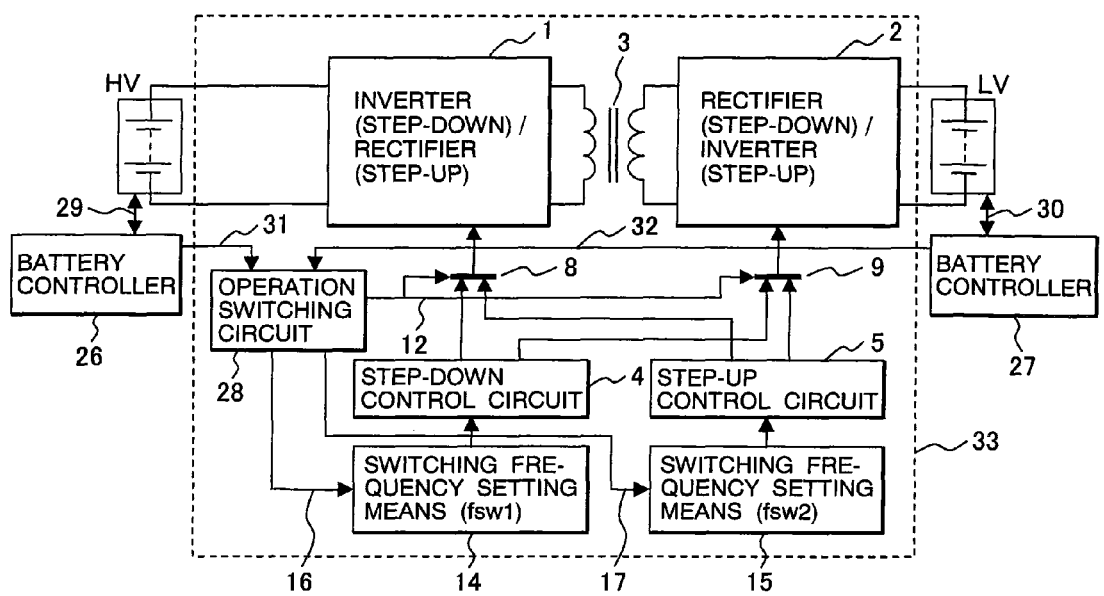
FIG. 9 shows the entire structure of a bi-directional DC-DC converter according to a fifth embodiment of the present invention.

FIG. 9 shows the entire structure of a bi-directional DC-DC converter according to a fifth embodiment of the present invention. The functional parts in FIG. 9 that are identical to the corresponding ones in FIG. 1 are assigned the same reference numerals to eliminate duplicate description. FIG. 9 differs from FIG. 1 in that the structure in FIG. 6 is further modified; the bi-directional DC-DC converter further comprises a battery controller 26 for monitoring and controlling the state of the battery in the high-voltage DC power supply HV and a battery controller 27 for monitoring and controlling the state of the battery in the low-voltage DC power supply LV. A signal line 29, which includes information about the HV voltage and current and the like, connects the high-voltage DC power supply HV to the battery controller 26. An operation selecting circuit 28 receives a state signal 31 concerning the HV from the battery controller 26. Similarly, a signal line 30 connects the LV to the battery controller 27, and the battery controller 27 inputs a state signal 32 concerning the LV into the operation selecting circuit 28. The operation selecting circuit 28 thus switches between step-down control and step-up control of the bi-directional DC-DC converter 33, according to the states of the batteries of the high-voltage DC power supply HV and low-voltage DC power supply LV respectively sent from the battery controllers 26 and 27. That is, the operation selecting circuit 28 receives the HV state signal 31 from the battery controller 26 and the LV state signal 32 from the batter controller 27, and outputs the step-down/step-up control signal 12, fsw1 switching signal 16, and fsw2 switching signal 17.

According to the fifth embodiment, the battery controllers 26 and 27, which monitor the states of the HV and LV batteries, enables precise switching between step-down control and step-up control and precise setting of the switching frequencies fsw1 and fsw2. Since signals can be received from battery controllers specific to battery state monitoring, processing for battery state confirmation does not need to be performed in the operation selecting circuit 28, providing an effect of reducing the size of the operation selecting circuit 28.

Sixth Embodiment

Figure 10:
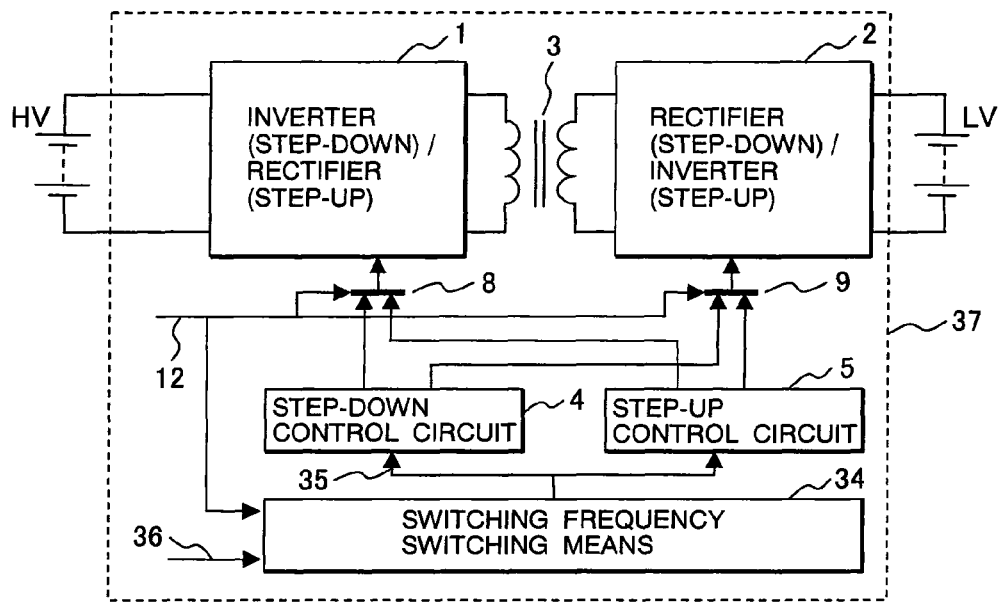
FIG. 10 shows the entire structure of a bi-directional DC-DC converter according to a sixth embodiment of the present invention.

FIG. 10 shows the entire structure of a bi-directional DC-DC converter according to a sixth embodiment of the present invention. The functional parts in FIG. 10 that are identical to the corresponding ones in FIG. 1 are assigned the same reference numerals to eliminate duplicate description. FIG. 10 differs from FIG. 9 in that a switching frequency switching means 34 is provided as a modified part. Other parts not shown are structured as shown in FIG. 9. The switching means 34 outputs a clock frequency switching signal 35 used to set frequencies for control signals generated by the step-down control circuit 4 and step-up control circuit 5. A clock frequency switching signal 36 is used to set the frequency of the clock signal 35. Reference numeral 37 indicates a bi-directional DC-DC converter. The step-down/step-up control switching signal 12 and clock frequency switching signal 36 are generated as illustrated in FIGS. 6 to 9.

During the step-down operation, the step-down/step-up control switching signal 12 commands a voltage drop, so the frequency switching means 34 outputs a clock signal 35 for the step-down operation. The step-down control circuit 4 receives the clock signal 35 and outputs a control signal for the step-down operation. The control signal is supplied to the main high-voltage circuit 1 and main low-voltage circuit 2 through the selectors 8 and 9. In this case, the selectors 8 and 9 select a signal from the step-down control circuit 4 according to the step-down/step-up control switching signal 12, and output it. The clock signal 35 for step-down control is also supplied to the step-up control circuit 5, so the step-up control circuit 5 also outputs to the selectors a signal at the same frequency as the signal in the step-down control circuit 4. However, the selectors 8 and 9 have selected the signals from the step-down control circuit 4, causing no problem. It is also possible to use the step-down/step-up control switching signal 12 or the like to control the step-up control circuit 5 so that it does not operate.

During the step-up operation, the step-down/step-up control switching signal 12 commands voltage boosting, so the frequency switching means 34 outputs a clock signal 35 for the step-up operation. The step-up control circuit 5 receives the clock signal 35 and outputs a control signal for the step-up operation. The control signal is supplied to the main high-voltage circuit 1 and main low-voltage circuit 2 through the selectors 8 and 9. In this case, the selectors 8 and 9 select a signal from the step-up control circuit 5 according to the step-down/step-up control switching signal 12 and output it. The clock signal 35 for step-up control is also supplied to the step-down control circuit 4, but no problem occurs as in the step-down operation. In the step-up operation as well, it is also possible to use the step-down/step-up control switching signal 12 or the like to control the step-down control circuit 4 so that it does not operate.

The frequency switching means 34 shown in FIG. 10 can function during both the step-down operation and step-up operation in a single circuit block, according to the step-down/step-up control switching signal 12 and clock signal 36. This idea can also be applied to the embodiments in FIGS. 6 to 9.

According to the sixth embodiment, there is no need to provide the frequency switching means 34 for each of the step-down and step-up operations, so a switching frequency for step-down control and a switching frequency for step-up control can be set separately with less circuit devices.

Seventh Embodiment

Figure 11:
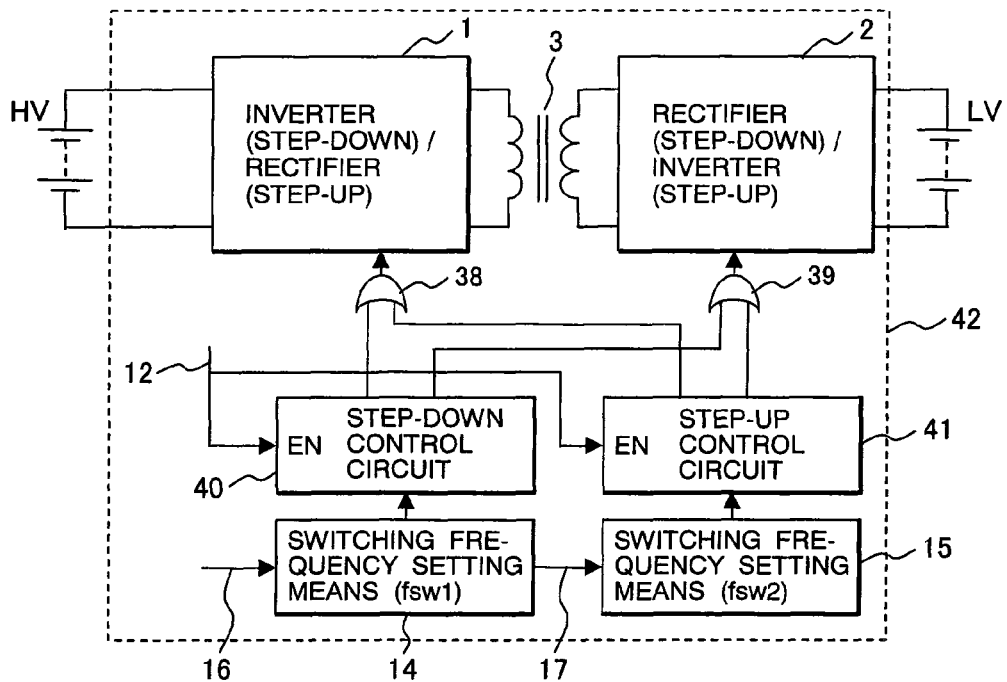
FIG. 11 shows the entire structure of a bi-directional DC-DC converter according to a seventh embodiment of the present invention.

FIG. 11 shows the entire structure of a bi-directional DC-DC converter according to a seventh embodiment of the present invention. The functional parts in FIG. 11 that are identical to the corresponding ones in FIG. 10 are assigned the same reference numerals to eliminate duplicate description. Only differences from FIG. 10 will be described. In FIG. 11, reference numerals 38 and 39 each indicate an OR circuit; reference numeral 40 indicates a step-down control circuit with an enable terminal; reference numeral 41 indicates a step-up control circuit with an enable terminal; reference numeral 42 indicates a bi-directional DC-DC converter.

In the seventh embodiment as well, the step-down/step-up control switching signal 12 and clock frequency switching signals 16 and 17 are generated as illustrated in FIGS. 6 to 9, so they are not shown.

During a step-down operation, the step-down/step-up control switching signal 12 commands a voltage drop, so the step-down control circuit 40 operates and the step-up control circuit 41 does not operate. The step-up control circuit 41 is controlled so that when it is not operational, its output signal is low. The OR circuits 38 and 39 each OR the outputs of the step-down control circuit 40 and step-up control circuit 41 and send the resulting signal. Since the output of the step-up control circuit 41 is low, the output of the step-down control circuit 40 is sent to the main high-voltage circuit 1 and main low-voltage circuit 2. At this time, the switching frequency setting means 14 and 15 respectively supply a clock signal to the step-down control circuit 40 and step-up control circuit 41, according to the switching signals 16 and 17.

During a step-up operation, the step-down/step-up control switching signal 12 commands voltage boosting, so the step-down control circuit 40 does not operate and the step-up control circuit 41 operates. The step-down control circuit 40 is controlled so that when it is not operational, its output signal is low. The OR circuits 38 and 39 each OR the outputs of the step-down control circuit 40 and step-up control circuit 41 and send the resulting signal. Since the output of the step-down control circuit 40 is low, the output of the step-up control circuit 41 is sent to the main high-voltage circuit 1 and main low-voltage circuit 2. At this time, the switching frequency setting means 14 and 15 respectively supply a clock signal to the step-down control circuit 40 and step-up control circuit 41, according to the switching signals 16 and 17.

According to the seventh embodiment, Enable signals are input to the step-down control circuit 40 and step-up control circuit 41 so that they do not operate actively when they do not need to operate, providing an effect of reducing the power consumption of the control circuits. Of course, it is also possible to reduce the power consumption of the switching frequency setting means 14 and 15 by supplying Enable signals to them so that they stop when they do not need to operate. Furthermore, in the above structure, a circuit for selecting a signal from the step-down control circuit 40 and a signal from the step-up control circuit 41 can be implemented as a simple OR circuit.

Eighth Embodiment

Figure 12:
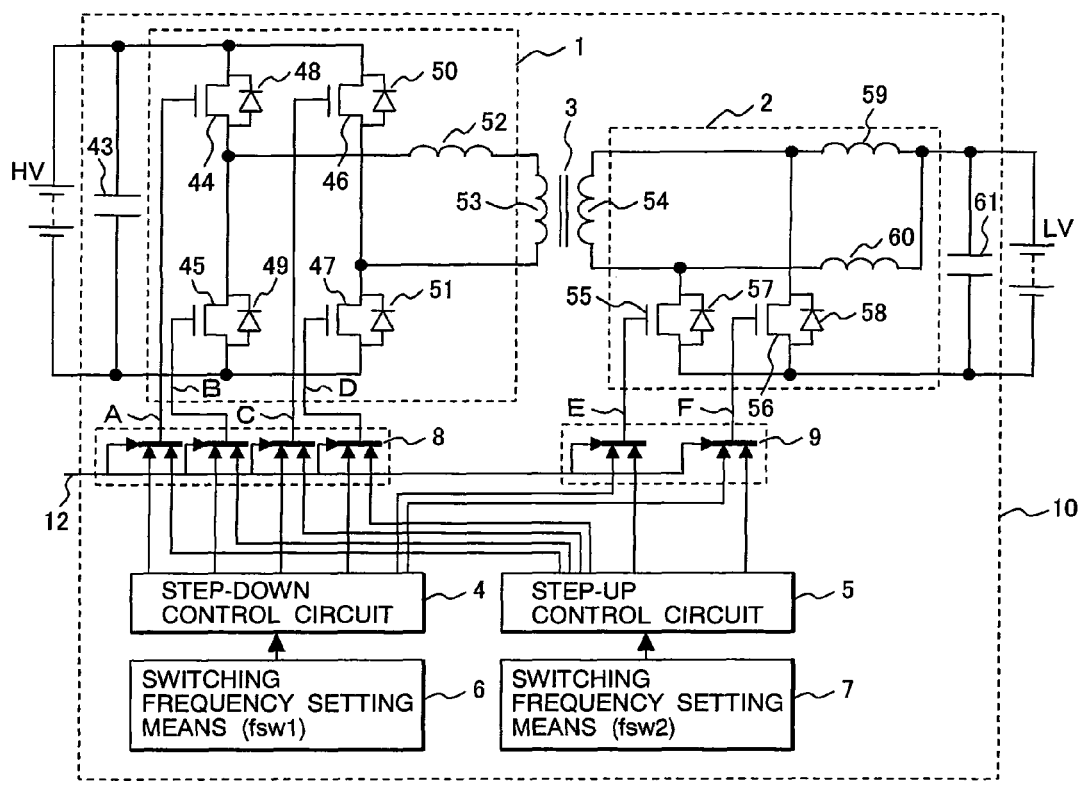
FIG. 12 shows the entire structure of a bi-directional DC-DC converter according to an eighth embodiment of the present invention.

FIG. 12 shows the entire structure of a bi-directional DC-DC converter according to an eighth embodiment of the present invention. The functional parts in FIG. 12 that are identical to the corresponding ones in FIG. 1 are assigned the same reference numerals to eliminate duplicate description. FIG. 12 shows examples of the internal structures of the main high-voltage circuit 1 and main low-voltage circuit 2 in FIG. 1.

First, the structure of the main high-voltage circuit 1 will be described. Connected to the high-voltage DC power supply HV are a smoothing capacitor 43, a pair of switching devices 44 and 45 connected in series, and another pair of switching devices 46 and 47 connected in series. Freewheel diodes 48 to 51 are respectively connected to the switching devices 44 to 47 in parallel. When the switching devices 44 to 47 are metal-oxide semiconductor field effect transistors (MOSFETs), body diodes can be used.

During the step-down operation, when the switching devices 44 to 47 are operated, a DC voltage is converted into an AC voltage and the AC voltage is generated on the primary winding 53 of the transformer 3 through an auxiliary reactor 52. When the polarity of the current flowing in the primary winding 53 of the transformer 3 is inverted, the auxiliary reactor 52 adjusts the current gradient. The auxiliary reactor 52 may be replaced with a leak inductance of the transformer 3; in this case, the auxiliary reactor 52 can be eliminated.

During the step-up operation, the AC voltage generated on the primary winding 53 of the transformer 3 is rectified and converted by diodes 48 to 51 into a DC voltage. The switching devices 44 to 47 may be kept turned on while forward current flows from the anode to the cathode in each of the diodes 48 to 51, that is, so-called synchronous rectification may be performed.

Next, the structure of the main low-voltage circuit 2 will be described. In the example in FIG. 12, a current-doubler synchronous rectifier is used as the main low-voltage circuit. The current-doubler synchronous rectifier is well-known, as disclosed in, for example, Japanese Patent Laid-open No. 2003-199339. Connected in parallel to the low-voltage DC power supply LV are a smoothing capacitor 61, a pair of a reactor 59 and switching device 56 connected in series, and another pair of a reactor 60 and switching device 55 connected in series; the smoothing capacitor 61 and the reactor 60 and switching device 55 pairs are connected in parallel. Freewheel diodes 58 and 57 are respectively connected to the switching devices 56 and 55 in parallel. When the switching devices 56 and 55 are MOSFETs, body diodes can be used.

During the step-down operation, the main low-voltage circuit 2 configured as the current-doubler circuit rectifies the AC voltage generated on the transformer 3 by using the diodes 57 and 58. The reactors 59 and 60 and the capacitor 61 smooth the rectified voltage to obtain a DC voltage LV. The switching devices 55 and 56 may be kept turned on while forward current flows from the anode to the cathode in each of the diodes 57 and 58, that is, so-called synchronous rectification may be performed.

During the step-up operation, the switching devices 55 and 56 are turned on alternately to convert the DC voltage LV to an AC voltage and generate the AC voltage on the secondary winding 54 of the transformer 3. The generated AC voltage is converted according to the turns ratio of the transformer 3, and then rectified into a DC voltage by the main high-voltage circuit 1, resulting in a high DC voltage.

In the example in the eighth embodiment, MOSFETs are used as the switching devices, but switching devices such as insulated gate bipolar transistors (IGBTs) may be used without problems.

Figure 13:
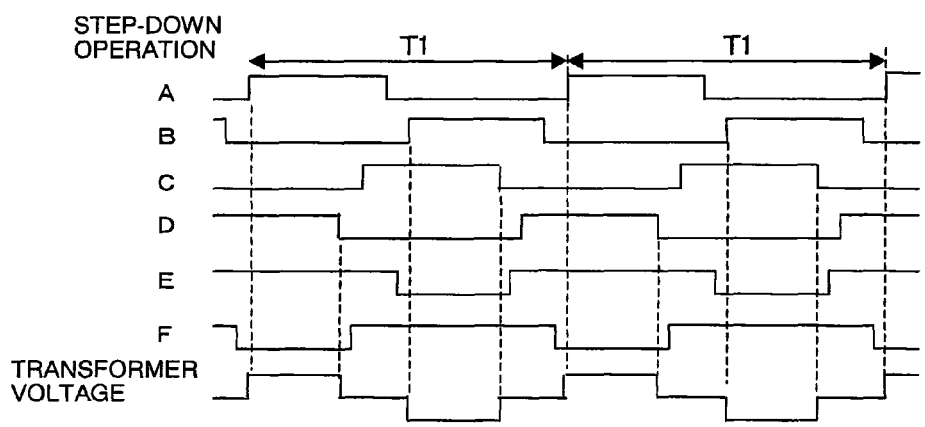
FIG. 13 shows an example of timing charts when a step-down operation is performed in FIG. 12.

FIG. 13 shows an example of timing charts when the step-down operation is performed in FIG. 12. The gate signals of the switching devices 44 to 47, 55, and 56 are indicated by A to F.

The gate signals A and B have a period during which they are kept low concurrently so that both switching devices 44 and 45 are not turned on concurrently. Similarly, the gate signals C and D have a period during which they are kept low concurrently so that both switching devices 46 and 47 are not turned on concurrently. In this case, A and C are controlled in such a way that they are shifted from each other. While both A and D are on and both B and C are on, a voltage is generated on the primary winding of the transformer 3 and electric power is supplied to the low-voltage side through the transformer 3. The switching devices 55 and 56 on the low-voltage side perform synchronous rectification according to the control signals E and F shown in FIG. 13 so that the AC voltage generated on the secondary winding of the transformer 3 is rectified. The switching frequency at that time is 1/T1. The switching frequency setting means 6 enables a switching frequency suitable for the step-down operation to be set without being affected by the step-up operation.

Figure 14:
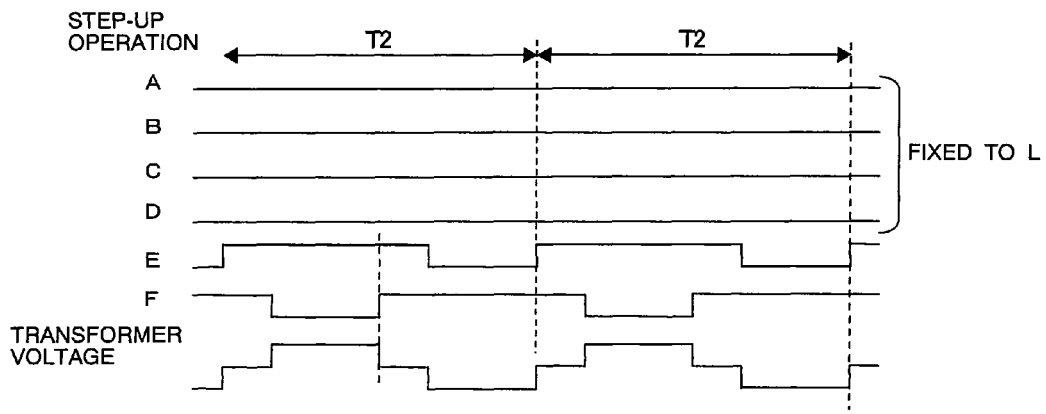
FIG. 14 shows an example of timing charts when a step-down operation is performed in FIG. 12.

FIG. 14 shows examples of timing charts when the step-up operation is performed in FIG. 12. In this example, the AC voltage generated on the primary winding of the transformer 3 is rectified by the diodes 48 to 51 with A to D turned off. The control signals E and F used to control the switching devices 55 and 56 on the low-voltage side are switched alternately as shown in FIG. 14 so as to generate an AC voltage on the secondary winding 54 of the transformer 3 and supply electric power to the high-voltage side. The switching frequency at that time is 1/T2. The switching frequency setting means 7 enables a switching frequency suitable for the step-up operation to be set without being affected by the step-down operation.

Ninth Embodiment

Figure 15:
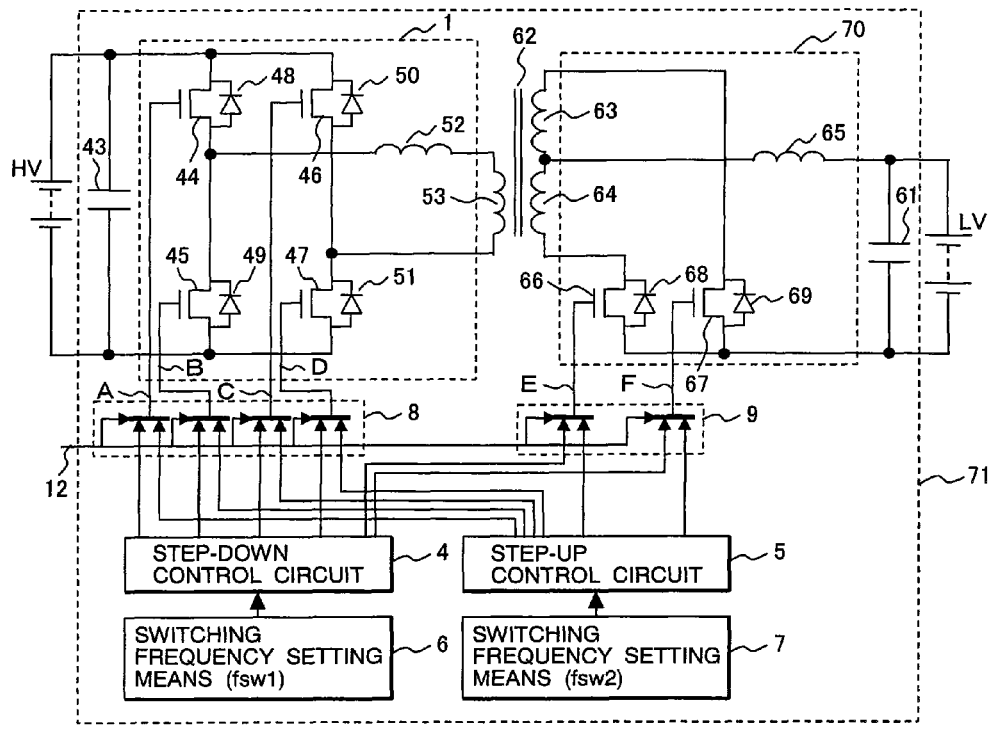
FIG. 15 shows the entire structure of a bi-directional DC-DC converter according to a ninth embodiment of the present invention.

FIG. 15 shows the entire structure of a bi-directional DC-DC converter according to a ninth embodiment of the present invention. The functional parts in FIG. 15 that are identical to the corresponding ones in FIG. 12 are assigned the same reference numerals to eliminate duplicate description. FIG. 15 differs from FIG. 12 in that the secondary winding of the transformer 62 has a center tap, at which the winding is divided into segments 63 and 64. Accordingly, the main low-voltage circuit is changed to a structure indicated by reference numeral 70. The main low-voltage circuit 70 comprises a reactor 65, switching devices 66 and 67, and diodes 68 and 69 connected in parallel to these switching devices. When the switching devices 66 and 67 are metal-oxide MOSFETs, body diodes can be used as the diodes 68 and 69.

The operation of the main circuit 70 having a center tap is well known through, for example, documents, so its detailed description will be omitted. Timing charts for controlling the embodiment in FIG. 15 indicate operations similar to those in FIGS. 13 and 14.

Although exemplary circuits that practice embodiments 8 and 9 of the present invention were shown in FIGS. 12 and 15 in detail, it would be appreciated that the main high-voltage circuit and main low-voltage circuit are not limited to the circuits shown in these drawings, but any circuits that can operate as both an inverter and a rectifier can be used.

Tenth Embodiment

Figure 16:
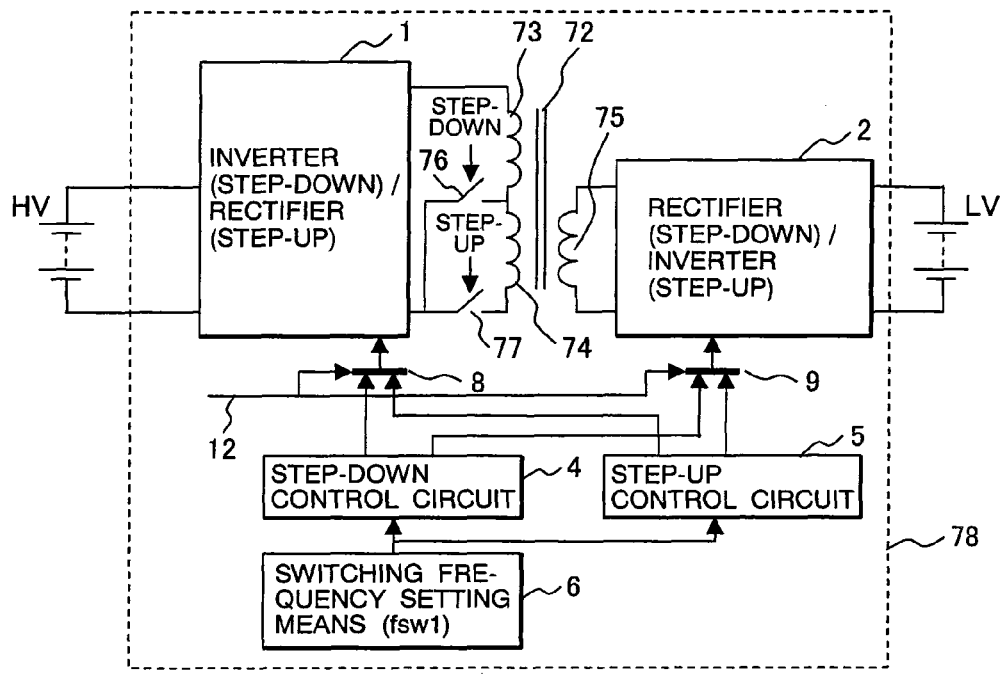
FIG. 16 shows the entire structure of a bi-directional DC-DC converter according to a tenth embodiment of the present invention.

FIG. 16 shows the entire structure of a bi-directional DC-DC converter according to a tenth embodiment of the present invention. The functional parts in FIG. 16 that are identical to the corresponding ones in FIG. 12 are assigned the same reference numerals to eliminate duplicate description. The bi-directional DC-DC converter 78 in the tenth embodiment is structured so that the transformer turns ratios are changed by switches 76 and 77 between the step-down operation and the step-up operation. The primary winding of the transformer 72 is divided into segments 73 and 74. The secondary winding is indicated by reference numeral 75.

During the step-down operation, the switch 76 is turned on and the switch 77 is turned off so that only the segment 73 of the primary winding is used to reduce the turns ratio (N1) of the transformer 72. During the step-up operation, the switch 76 is turned off and the switch 77 is turned on so that the segments 73 and 74 of the primary winding are connected in series to increase the turns ratio (N2) of the transformer 72. Since the turns ratio of the transformer 72 is changed between the step-down operation and the step-up operation as described above, the step-down ratio and step-up ratio can be set to values optimal to the respective operations. In the tenth embodiment, the step-down control circuit 4 and step-up control circuit 5 are operated according to signals generated by the switching frequency setting means 6, so the switching frequencies during the step-down operation and the step-up operation are the same. Therefore, the transformer 72 is used to make a switchover between the step-down ratio and the step-up ratio. The operations in the tenth embodiment are the same as in the embodiment shown in FIG. 1 except that the turns ratios of the primary transformer are changed.

According to the tenth embodiment, the step-down ratio and step-up ratio can be changed to desired value by operating switches such as relays. When the converter is mounted on a vehicle, relays and other switches may cause incorrect contacts due to vibration, bi-directional DC-DC converters as described so far are considered to be more preferable.

It would be understood that with a switching frequency setting means for the step-down control circuit 4 and another switching frequency setting means for the step-up control circuit 5 provided independently as shown in FIG. 1, a means for setting switching frequencies optimal for the step-down operation and step-up operation can be provided together.

Eleventh Embodiment

Figure 17:
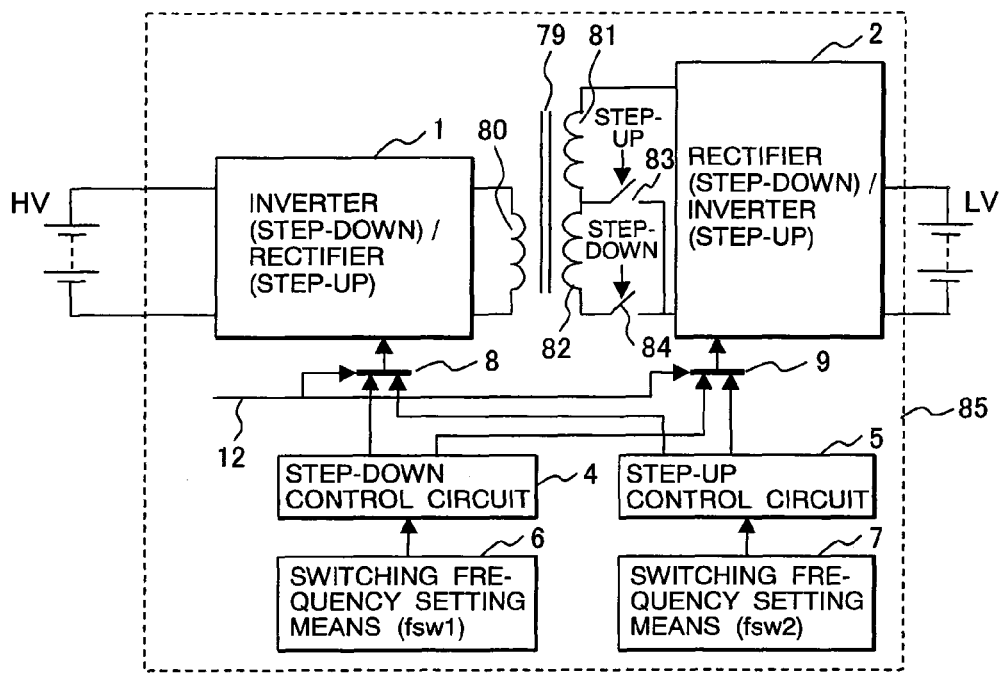
FIG. 17 shows the entire structure of a bi-directional DC-DC converter according to an eleventh embodiment of the present invention.

FIG. 17 shows the entire structure of a bi-directional DC-DC converter according to an eleventh embodiment of the present invention. The functional parts in FIG. 17 that are identical to the corresponding ones in FIG. 16 are assigned the same reference numerals to eliminate duplicate description. The bi-directional DC-DC converter 85 in the eleventh embodiment is also structured so that the transformer turns ratios are switched between the step-down operation and the step-up operation. FIG. 17 differs from FIG. 16 in that the turns ratios are switched by switches 83 and 84 between the step-down operation and the step-up operation on the secondary winding side of the transformer 79. The primary winding 80 of the transformer 79 is divided into segments 81 and 82. Reference numeral 83 and 84 indicates switches, and reference numeral 85 indicates a bi-directional DC-DC converter.

During the step-down operation, the switch 83 is turned off and the switch 84 is turned on so that the segments 81 and 82 of the secondary winding are connected in series to decrease the turns ratio (N1). During the step-up operation, the switch 83 is turned on and the switch 84 is turned off so that only the segment 81 of the secondary winding is used to increase the turns ratio (N2) of the transformer 79. This type of operation provides an effect similar to that in the tenth embodiment shown in FIG. 16.

Twelfth Embodiment

Figure 18:
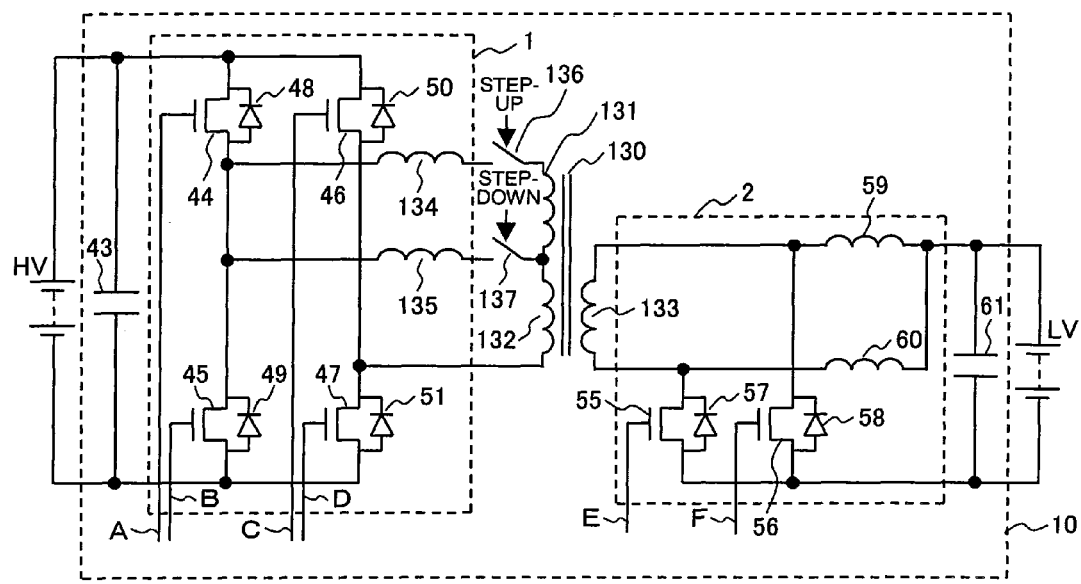
FIG. 18 shows the entire structure of a bi-directional DC-DC converter according to a twelfth embodiment of the present invention.

FIG. 18 shows the entire structure of a bi-directional DC-DC converter according to a twelfth embodiment of the present invention. The functional parts in FIG. 18 that are identical to the corresponding ones in FIG. 12 are assigned the same reference numerals to eliminate duplicate description. In the twelfth embodiment, the structure of the main circuit in FIG. 12 is used as the base, and the taps of the transformer are selectively used to switch reactor values and transformer turns ratios between the step-down operation and the step-up operation. During the step-down operation, the switch 136 is turned off and the switch 137 is turned on so that the auxiliary reactor 135 and primary winding 132 are operated effectively. During the step-up operation, the switch 136 is turned on and the switch 137 is turned off so that the auxiliary reactor 134 and the primary windings 131 and 132 are operated effectively. Accordingly, the auxiliary reactor value during the step-up operation is made small and the transformer turns ratios are made large, relative to the step-down operation. The reason why a small auxiliary reactor value is set during the step-up operation is that due to a voltage drop caused by the auxiliary reactor, the voltages generated on the primary windings 131 and 132 are not supplied effectively to the high-voltage DC power supply HV.

Thirteenth Embodiment

Figure 19:
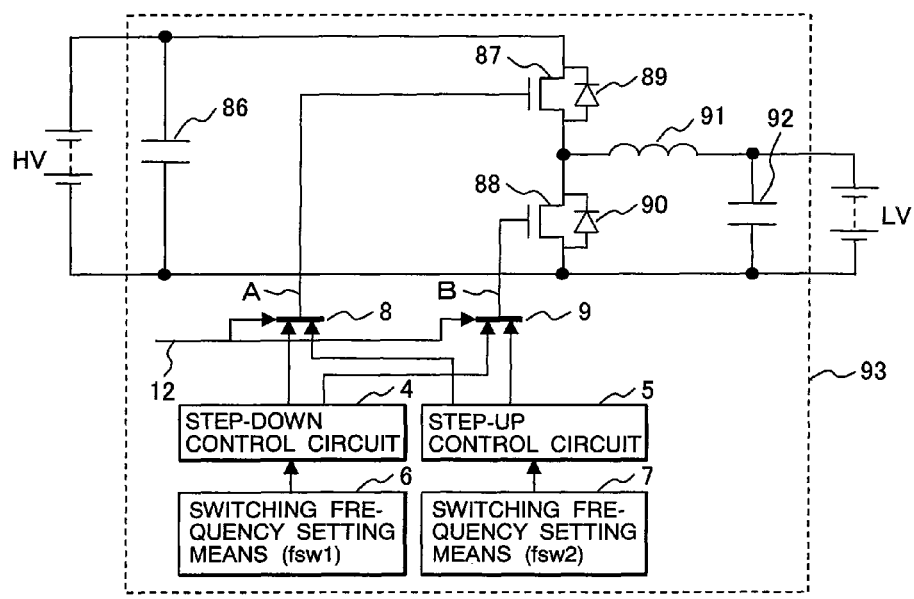
FIG. 19 shows the entire structure of a bi-directional DC-DC converter according to a thirteenth embodiment of the present invention.

FIG. 19 shows the entire structure of a bi-directional DC-DC converter according to a thirteenth embodiment of the present invention. The functional parts in FIG. 19 that are identical to the corresponding ones in the previous drawings are assigned the same reference numerals to eliminate duplicate description. The bi-directional DC-DC converter in the thirteenth embodiment is an example of a non-insulated bi-directional DC-DC converter that does not use a transformer for electric power conversion. Reference numeral 86 indicates a smoothing capacitor on the high-voltage side, reference numerals 87 and 88 indicate switching devices, and reference numerals 89 and 90 indicate diodes. When the switching devices 87 and 88 are MOSFETs, body diodes can be used as the diodes 89 and 90. Reference numeral 91 indicates a reactor, and reference numeral 92 indicates a smoothing capacitor on the low-voltage side.

When the switching device 87 is operated during the step-down operation, electric power is sent from the HV side to the LV side. Specifically, when the switching device 87 is turned off, the current flowing in the reactor 91 causes the diode 90 to supply a forward current. At that time, the switch 88 can be turned on to perform synchronous rectification.

When the switching device 88 is operated during the step-up operation, electric power is sent from the LV side to the HV side. Specifically, when the switching device 88 is turned off, the current flowing in the reactor 91 causes the diode 89 to supply a forward current. At that time, the switch 87 can be turned on to perform synchronous rectification. The bi-directional DC-DC converter is indicated by reference numerals 93.

Figure 20A:
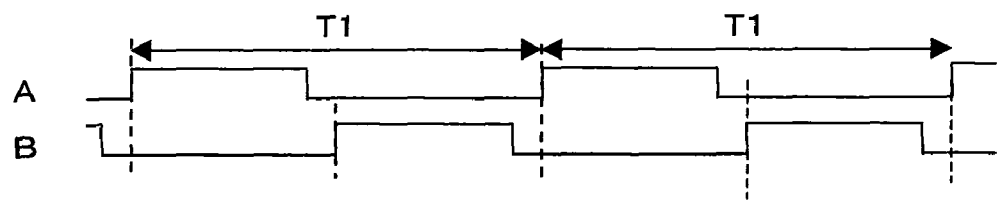
FIG. 20 shows examples of timing charts during a step-down operation and step-up operation in the thirteenth embodiment in FIG. 19.
Figure 20B:
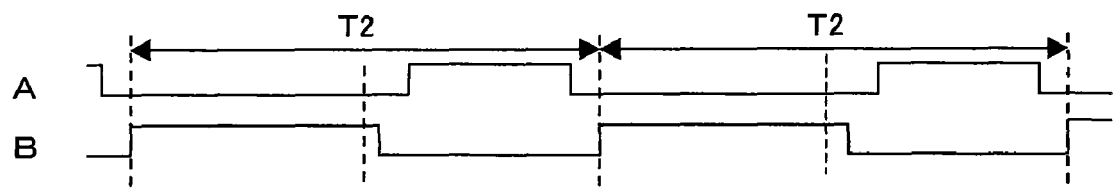

FIG. 20 shows examples of timing charts when the bi-directional DC-DC converter according to the thirteenth embodiment of the present invention in FIG. 19 performs the step-down operation and step-up operation, assuming that synchronous rectification is performed. The switching frequency cycle during the step-down operation, given as T1, and the switching frequency cycle during the step-up operation, given as T2, can be controlled independently.

According to the thirteenth embodiment, if the switching frequency during the step-down operation and the switching frequency during the step-up operation are controlled independently, it is possible in the non-insulated converter as well to set the step-down ratio and step-up ratio in a wide range.

Fourteenth Embodiment

Figure 21:
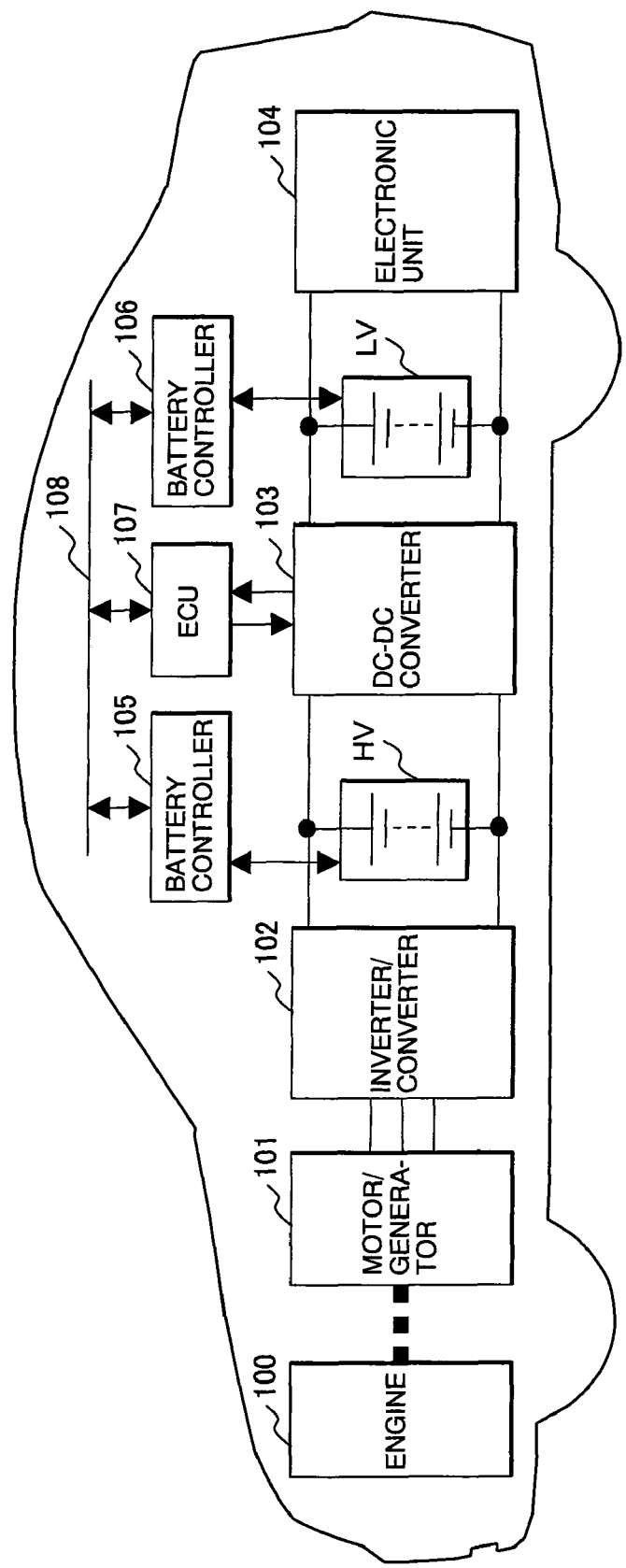
FIG. 21 shows, as a fourteenth embodiment of the present invention, a system structure in which a bi-directional DC-DC converter is applied to a vehicle-mounted hybrid system.

FIG. 21 shows, as a fourteenth embodiment of the present invention, a system structure in which a bi-directional DC-DC converter is applied to a vehicle-mounted hybrid system. Reference numeral 100 indicates an engine; reference numeral 101 indicates a motor/generator for powering and regeneration, which operates as the inverter during powering and operates as the generator during regeneration; reference numerals 102 indicates an inverter/converter, which operates as the inverter during powering and rotates a motor by using electric power of the high-voltage DC power supply HV, and operates as the converter during regeneration and converts the AC voltage generated by the generator and charges the high-voltage DC power supply HV.

The bi-directional DC-DC converter 103 is disposed between the HV and the LV and performs bi-directional power conversion. An electronic unit 104 is mounted on the vehicle. Battery controllers 105 and 106 respectively control the power of the HV and LV. An electronic control unit ECU 106 functions as a high-end unit that controls the bi-directional DC-DC converter 103. Specifically, the ECU 106 switches the bi-directional DC-DC converter 103 between the step-down operation and the step-up operation, sends setting information about the switching frequency to the DC-DC converter 103, and receives the operation state and other information from the DC-DC converter 103. The battery controllers 105 and 106 and electronic control unit ECU 106 mutually communicate through a network 108 to transmit and receive information.

The DC-DC converter 103 in the fourteenth embodiment communicates directly with the electronic control unit ECU 106. However, the DC-DC converter 103 may also use the network 108 to communicate with the electronic control unit ECU 106 and battery controllers 105 and 106.

In the fourteenth embodiment, it is assumed that, during the step-down operation, the DC-DC converter 103 functions to supply electric power to the vehicle-mounted electronic unit connected to the LV power supply and that, during the step-up operation, it functions as an emergency unit to start the engine when the voltage of the HV is lowered. However, the present invention is not limited to these applications but can be used to convert electric power between DC voltages. The high-voltage DC power supply and low-voltage power DC power supply described above are assumed to comprise a secondary battery, a capacitor, and other parts.

The above embodiments of the present invention are effective in bi-directionally converting electric power between a high-voltage DC power supply and a low-voltage DC power supply in a vehicle-mounted system when there is a large difference in voltage between the power supplies and their voltages largely vary during an operation.

INDUSTRIAL APPLICABILITY

The above embodiments have been mainly described about vehicle-mounted applications, but the present invention can also be applied to other applications in which, for example, DC-DC power conversion is necessary in a battery charging/discharging system.

What is claimed is:

1. A bi-directional DC-DC converter comprising:
a main high-voltage circuit having a first switching device;
a main low-voltage circuit having a second switching device;
a transformer whose ratio of the number of turns is N1/N2 (N1>N2), operatively connected between the main high-voltage circuit and the main low-voltage circuit;
a step-down controller configured to control the first and second switching devices in the respective main high-voltage circuit and the main low-voltage circuit using a first switching frequency; and
a step-up controller configured to control the first and second switching devices in the respective main high-voltage circuit and the main low-voltage circuit using a second switching frequency which is different from the first switching frequency; wherein
the second switching frequency during step-up operation is set up lower than the first switching frequency during step-down; and
a step-up ratio during the step-up operation is larger than the ratio of the number of the transformer turns (N1/N2).

2. The bi-directional DC-DC converter according to claim 1, wherein the step-down and step-up controllers each have a frequency setting means for individually setting the respective first and second switching frequency.

3. The bi-directional DC-DC converter according to claim 2, wherein the frequency setting means sets the switching frequency individually according to an external signal.

4. The bi-directional DC-DC converter according to claim 2, wherein the frequency setting means is configured to switch among a plurality of resistance values used to select an oscillation frequency of an oscillator, to switch among a plurality of oscillators with different frequencies, or to switch a signal frequency of a PWM generator by changing a constant of an external part.

5. The bi-directional DC-DC converter according to claim 1, wherein the main high-voltage and low-voltage circuits are each controlled through frequency modulation performed by the step-down and step-up controllers, and the first and second switching frequencies thereof are changed in different frequency ranges.

6. The bi-directional DC-DC converter according to claim 1, wherein at least one of the step-down and step-up controllers is operative to detect a voltage at, at least, one of two output terminals of the bi-directional DC-DC converter, and to adjust at least one of the first switching frequency and the second switching frequency according to the detected voltage.

7. The bi-directional DC-DC converter according to claim 1, further comprising:
a first secondary battery and a second secondary battery connected to two output terminals of the bi-directional DC-DC converter;
a battery controller for monitoring the state of the first secondary battery or the second secondary battery; and
a frequency setting means for setting at least one of the first switching frequency and the second switching frequency according to a signal from the battery controller.

8. The bi-directional DC-DC converter according to claim 1, further comprising a step-up/step-down switching means for switching between step-up and step-down according an external signal.

9. The bi-directional DC-DC converter according to claim 1, further comprising a step-up/step-down switching means for switching between step-up and step-down according to a voltage at one of two output terminals of the bi-directional DC-DC converter.

10. The bi-directional DC-DC converter according to claim 1, further comprising a system that has a first secondary battery connected to one terminal of the bi-directional DC-DC converter, the first secondary battery generating a first voltage, a first battery controller connected to the first secondary battery, a second secondary battery connected to another terminal of the bi-directional DC-DC converter, the second secondary battery generating a second voltage, a second battery controller connected to the second secondary battery, and a step-up/step-down switching means for switching between step-up and step-down according to a signal from one of the first battery controller and the second battery controller.

11. The bi-directional DC-DC converter according to claim 1, further comprising a system that has a first secondary battery connected to one terminal of the bi-directional DC-DC converter to generate a first voltage;
a first battery controller for monitoring the state of the first secondary battery;
a second secondary battery connected to another terminal of the bi-directional DC-DC converter to generate a second voltage,
a second battery controller for monitoring the state of the second secondary battery; and
a step-up/step-down switching command means for accepting a signal from one of the first battery controller and the second battery controller and outputting a step-up/step-down switching signal to switch to one of the step-down and step-up controller between step-up and step-down.

12. The bi-directional DC-DC converter according to claim 1, further comprising a system that has a controller configured to send a step-up or step-down command to a selected one of the step-down and step-up controller and to be notified of an operation state of at least one of the step-down and step-up controllers.

13. The bi-directional DC-DC converter according to claim 1, further comprising:
- a voltage detector arranged to detect a voltage at one terminal of the bi-directional DC-DC converter; and
- a voltage controller arranged to control the switching device in one of the main high-voltage and low-voltage circuit so that a detected voltage is moved toward a target voltage.

14. A method of controlling a bi-directional DC-DC converter that has a main high-voltage circuit having a first switching device, a main low-voltage circuit having a second switching device, and a transformer whose ratio of the number of turns is N1/N2 (N1>N2), operatively connected between the main high-voltage circuit and the main low-voltage circuit, comprising:

- controlling the first and second switching devices in the respective main high-voltage circuit and the main low-voltage circuit using a first switching frequency for step down control; and
- controlling the first and second switching devices in the respective main high-voltage circuit and the main low-voltage circuit using a second switching frequency which is different from the first switching frequency; wherein:
- the second switching frequency during step-up is set up lower than the first switching frequency during step-down; and
- a step-up ratio during step-up is higher than the ratio of the number of the transformer turns (N1/N2).

* * * * *